US010356226B2

(12) United States Patent
Frenkel

(10) Patent No.: US 10,356,226 B2
(45) Date of Patent: Jul. 16, 2019

(54) SECURE CONNECTION WITH PROTECTED FACILITIES

(71) Applicant: Waterfall Security Solutions Ltd., Rosh HaAyin (IL)

(72) Inventor: Lior Frenkel, Misgav Dov (IL)

(73) Assignee: Waaterfall Security Solutions Ltd., Rosh HaAyin (IL)

( * ) Notice: Subject to any disclaimer, the term of this patent is extended or adjusted under 35 U.S.C. 154(b) by 252 days.

(21) Appl. No.: 15/412,014

(22) Filed: Jan. 22, 2017

(65) Prior Publication Data

US 2017/0237834 A1    Aug. 17, 2017

Related U.S. Application Data

(60) Provisional application No. 62/295,074, filed on Feb. 14, 2016.

(51) Int. Cl.
*G06F 15/16* (2006.01)
*H04L 29/06* (2006.01)
(Continued)

(52) U.S. Cl.
CPC .............. *H04L 69/16* (2013.01); *H04L 49/15* (2013.01); *H04L 63/0281* (2013.01); *H04L 63/18* (2013.01); *H04L 67/141* (2013.01)

(58) Field of Classification Search
USPC ....................................................... 709/227
See application file for complete search history.

(56) References Cited

U.S. PATENT DOCUMENTS

| 4,163,289 A | 7/1979 | Schmidt |
| 4,213,177 A | 7/1980 | Schmidt |

(Continued)

FOREIGN PATENT DOCUMENTS

| EP | 1632833 A2 | 3/2006 |
| GB | 2267986 A | 12/1993 |

(Continued)

OTHER PUBLICATIONS

IBM Technical Disclosure Bulletin, Separate Write/Read Logical Paths to Optimize Library Network File System Data Rates, vol. 37, No. 09, pp. 1-3, Sep. 1994.

(Continued)

*Primary Examiner* — Alicia Baturay
(74) *Attorney, Agent, or Firm* — Kligler & Associates

(57) ABSTRACT

A system for communication includes a station, including first and second interfaces having different, respective first and second network addresses on a packet data network, and a terminal, including third and fourth interfaces having different, respective third and fourth network addresses. The station is transmits data to the terminal over a first path directed from the first interface to the third network address, while the terminal transmits second data to the station over a second path directed from the fourth interface to the second network address. First and second TCP proxies are deployed respectively in the station and in the terminal, and are configured to emulate a TCP connection between the station and the terminal by transmitting TCP frames from the station to the terminal only over the first path and from the terminal to the station only over the second path.

18 Claims, 2 Drawing Sheets

(51) Int. Cl.
*H04L 12/933* (2013.01)
*H04L 29/08* (2006.01)

(56) References Cited

U.S. PATENT DOCUMENTS

| | | | |
|---|---|---|---|
| 4,214,302 A | 7/1980 | Schmidt | |
| 4,375,665 A | 3/1983 | Schmidt | |
| 4,964,046 A | 10/1990 | Mehrgardt et al. | |
| 4,985,919 A | 1/1991 | Naruse et al. | |
| 4,987,595 A | 1/1991 | Marino, Jr. et al. | |
| 5,140,681 A | 8/1992 | Uchiyama et al. | |
| 5,163,138 A | 11/1992 | Thirumalai | |
| 5,185,877 A | 2/1993 | Bissett et al. | |
| 5,289,478 A | 2/1994 | Barlow et al. | |
| 5,388,212 A | 2/1995 | Grube et al. | |
| 5,530,758 A | 6/1996 | Marino, Jr. et al. | |
| 5,548,646 A | 8/1996 | Aziz et al. | |
| 5,677,952 A | 10/1997 | Blakley et al. | |
| 5,703,562 A | 12/1997 | Nilsen | |
| 5,732,278 A | 3/1998 | Furber et al. | |
| 5,748,871 A | 5/1998 | Dulac et al. | |
| 5,815,577 A | 9/1998 | Clark | |
| 5,822,435 A | 10/1998 | Boebert et al. | |
| 5,825,879 A | 10/1998 | Davis | |
| 5,829,046 A | 10/1998 | Tzelnic et al. | |
| 5,835,726 A | 11/1998 | Shwed et al. | |
| 5,940,507 A | 8/1999 | Cane et al. | |
| 5,946,399 A | 8/1999 | Kitaj et al. | |
| 5,995,628 A | 11/1999 | Kitaj et al. | |
| 6,023,570 A | 2/2000 | Tang et al. | |
| 6,049,611 A | 4/2000 | Tatebayashi et al. | |
| 6,134,661 A | 10/2000 | Topp | |
| 6,167,459 A | 12/2000 | Beardsley et al. | |
| 6,170,023 B1 | 1/2001 | Beardsley et al. | |
| 6,185,638 B1 | 2/2001 | Beardsley et al. | |
| 6,202,095 B1 | 3/2001 | Beardsley et al. | |
| 6,226,749 B1 | 5/2001 | Carloganu et al. | |
| 6,239,810 B1 | 5/2001 | Van Hook et al. | |
| 6,240,514 B1 | 5/2001 | Inoue et al. | |
| 6,289,377 B1 | 9/2001 | Lalwaney et al. | |
| 6,311,272 B1 | 10/2001 | Gressel | |
| 6,317,831 B1 | 11/2001 | King | |
| 6,442,607 B1 | 8/2002 | Korn et al. | |
| 6,467,009 B1 | 10/2002 | Winegarden et al. | |
| 6,470,449 B1 | 10/2002 | Blandford | |
| 6,574,640 B1 | 6/2003 | Stahl | |
| 6,601,126 B1 | 6/2003 | Zaidi et al. | |
| 6,601,170 B1 | 7/2003 | Wallace, Jr. | |
| 6,615,244 B1 | 9/2003 | Singhal | |
| 6,643,701 B1 | 11/2003 | Aziz et al. | |
| 6,738,388 B1 | 5/2004 | Stevenson et al. | |
| 6,738,742 B2 | 5/2004 | Badt et al. | |
| 6,758,404 B2 | 7/2004 | Ladyansky | |
| 6,862,663 B1 | 3/2005 | Bateman | |
| 6,915,369 B1 | 7/2005 | Dao et al. | |
| 6,915,435 B1 | 7/2005 | Merriam | |
| 6,931,549 B1 | 8/2005 | Ananda | |
| 6,957,330 B1 | 10/2005 | Hughes | |
| 6,963,817 B2 | 11/2005 | Ito et al. | |
| 6,966,001 B2 | 11/2005 | Obara et al. | |
| 6,970,183 B1 | 11/2005 | Monroe | |
| 6,986,061 B1 | 1/2006 | Kunzinger | |
| 7,031,322 B1 | 4/2006 | Matsuo | |
| 7,062,587 B2 | 6/2006 | Zaidi et al. | |
| 7,069,437 B2 | 6/2006 | Williams | |
| 7,100,048 B1 | 8/2006 | Czajkowski et al. | |
| 7,171,566 B2 | 1/2007 | Durrant | |
| 7,200,693 B2 | 4/2007 | Jeddeloh | |
| 7,234,158 B1 | 6/2007 | Guo et al. | |
| 7,254,663 B2 | 8/2007 | Bartley et al. | |
| 7,260,833 B1 | 8/2007 | Schaeffer | |
| 7,324,515 B1 | 1/2008 | Chapman | |
| 7,366,894 B1 | 4/2008 | Kallimuthu et al. | |
| 7,509,141 B1 | 3/2009 | Koenck et al. | |
| 7,523,856 B2 | 4/2009 | Block et al. | |
| 7,581,097 B2 | 8/2009 | Catherman et al. | |
| 7,649,452 B2 | 1/2010 | Zilberstein et al. | |
| 7,660,959 B2 | 2/2010 | Asher et al. | |
| 7,675,867 B1 | 3/2010 | Mraz et al. | |
| 7,685,436 B2 | 3/2010 | Davis et al. | |
| 7,698,470 B2 | 4/2010 | Ruckerbauer et al. | |
| 7,716,467 B1 | 5/2010 | Deffet et al. | |
| 7,761,529 B2 | 7/2010 | Choubal et al. | |
| 7,761,704 B2 | 7/2010 | Ho et al. | |
| 7,792,300 B1 | 9/2010 | Caronni | |
| 7,814,316 B1 | 10/2010 | Hughes et al. | |
| 7,815,548 B2 | 10/2010 | Barre et al. | |
| 7,845,011 B2 | 11/2010 | Hirai | |
| 7,849,330 B2 | 12/2010 | Osaki | |
| 7,941,828 B2 | 5/2011 | Jauer | |
| 7,992,209 B1 | 8/2011 | Menoher et al. | |
| 8,041,832 B2 | 10/2011 | Hughes et al. | |
| 8,046,443 B2 | 10/2011 | Parker et al. | |
| 8,223,205 B2 | 7/2012 | Frenkel et al. | |
| 8,756,436 B2 | 6/2014 | Frenkel et al. | |
| 8,793,302 B2 | 7/2014 | Frenkel et al. | |
| 9,116,857 B2* | 8/2015 | Frenkel | H04L 63/0485 |
| 9,130,768 B2* | 9/2015 | Moncaster | H04L 41/147 |
| 9,268,957 B2* | 2/2016 | Frenkel | G06F 21/62 |
| 9,305,189 B2* | 4/2016 | Mraz | G06F 21/85 |
| 9,369,446 B2* | 6/2016 | Frenkel | H04L 63/0428 |
| 9,419,975 B2* | 8/2016 | Frenkel | H04L 63/10 |
| 9,519,616 B2* | 12/2016 | Frenkel | H04L 63/0485 |
| 9,584,521 B2* | 2/2017 | Frenkel | H04L 63/10 |
| 9,635,037 B2* | 4/2017 | Frenkel | H04L 63/126 |
| 9,736,121 B2* | 8/2017 | Mraz | H04L 63/0428 |
| 9,762,536 B2* | 9/2017 | Frenkel | G06F 21/567 |
| 9,847,972 B2* | 12/2017 | Frenkel | G06F 21/567 |
| 10,063,517 B2* | 8/2018 | Frenkel | G06F 21/567 |
| 2001/0033332 A1 | 10/2001 | Kato et al. | |
| 2002/0064282 A1 | 5/2002 | Loukianov et al. | |
| 2002/0065775 A1 | 5/2002 | Monaghan | |
| 2002/0077990 A1 | 6/2002 | Ryan, Jr. | |
| 2002/0083120 A1 | 6/2002 | Soltis | |
| 2002/0112181 A1 | 8/2002 | Smith | |
| 2002/0174010 A1 | 11/2002 | Rice | |
| 2002/0186839 A1 | 12/2002 | Parker | |
| 2002/0188862 A1 | 12/2002 | Trethewey et al. | |
| 2002/0191866 A1 | 12/2002 | Tanabe | |
| 2002/0199181 A1 | 12/2002 | Allen | |
| 2003/0005295 A1 | 1/2003 | Girard | |
| 2003/0037247 A1 | 2/2003 | Obara et al. | |
| 2003/0039354 A1 | 2/2003 | Kimble et al. | |
| 2003/0061505 A1 | 3/2003 | Sperry et al. | |
| 2003/0114204 A1 | 6/2003 | Allen et al. | |
| 2003/0140090 A1 | 7/2003 | Rezvani et al. | |
| 2003/0140239 A1 | 7/2003 | Kuroiwa et al. | |
| 2003/0159029 A1 | 8/2003 | Brown et al. | |
| 2003/0188102 A1 | 10/2003 | Nagasoe et al. | |
| 2003/0212845 A1 | 11/2003 | Court et al. | |
| 2003/0217262 A1 | 11/2003 | Kawai et al. | |
| 2004/0022107 A1 | 2/2004 | Zaidi et al. | |
| 2004/0024710 A1 | 2/2004 | Fernando et al. | |
| 2004/0070620 A1 | 4/2004 | Fujisawa | |
| 2004/0071311 A1 | 4/2004 | Choi et al. | |
| 2004/0080615 A1 | 4/2004 | Klein et al. | |
| 2004/0125077 A1 | 7/2004 | Ashton | |
| 2004/0175123 A1 | 9/2004 | Lim et al. | |
| 2004/0181679 A1 | 9/2004 | Dettinger et al. | |
| 2004/0198494 A1 | 10/2004 | Nguyen et al. | |
| 2004/0217890 A1 | 11/2004 | Woodward et al. | |
| 2004/0247308 A1 | 12/2004 | Kawade | |
| 2004/0250096 A1 | 12/2004 | Cheung et al. | |
| 2005/0015624 A1 | 1/2005 | Ginter et al. | |
| 2005/0033990 A1 | 2/2005 | Harvey et al. | |
| 2005/0057774 A1 | 3/2005 | Maruyama | |
| 2005/0066186 A1 | 3/2005 | Gentle et al. | |
| 2005/0071632 A1 | 3/2005 | Pauker et al. | |
| 2005/0085964 A1 | 4/2005 | Knapp et al. | |
| 2005/0091487 A1 | 4/2005 | Cross et al. | |
| 2005/0108524 A1 | 5/2005 | Witchey | |
| 2005/0119967 A1 | 6/2005 | Ishiguro et al. | |
| 2005/0120214 A1 | 6/2005 | Yeates et al. | |
| 2005/0120251 A1 | 6/2005 | Fukumori et al. | |

(56) References Cited

U.S. PATENT DOCUMENTS

| | | |
|---|---|---|
| 2005/0138369 A1 | 6/2005 | Lebovitz et al. |
| 2005/0165939 A1 | 7/2005 | Nikunen et al. |
| 2005/0216648 A1 | 9/2005 | Jeddeloh |
| 2005/0264415 A1 | 12/2005 | Katz |
| 2005/0270840 A1 | 12/2005 | Kudelski |
| 2006/0047887 A1 | 3/2006 | Jeddeloh |
| 2006/0085354 A1 | 4/2006 | Hirai |
| 2006/0085534 A1 | 4/2006 | Ralston et al. |
| 2006/0064550 A1 | 5/2006 | Katsuragi et al. |
| 2006/0095629 A1 | 5/2006 | Gower et al. |
| 2006/0136724 A1 | 6/2006 | Takeshima et al. |
| 2006/0155939 A1 | 7/2006 | Nagasoe et al. |
| 2006/0161791 A1 | 7/2006 | Bennett |
| 2006/0165347 A1 | 7/2006 | Mita |
| 2006/0173787 A1 | 8/2006 | Weber et al. |
| 2006/0179208 A1 | 8/2006 | Jeddeloh |
| 2006/0195704 A1 | 8/2006 | Cochran et al. |
| 2006/0220903 A1 | 10/2006 | Zigdon et al. |
| 2006/0224848 A1 | 10/2006 | Matulik et al. |
| 2006/0242423 A1 | 10/2006 | Kussmaul |
| 2006/0248582 A1 | 11/2006 | Panjwani et al. |
| 2006/0259431 A1 | 11/2006 | Poisner |
| 2006/0271617 A1 | 11/2006 | Hughes et al. |
| 2006/0288010 A1 | 12/2006 | Chen et al. |
| 2006/0294295 A1 | 12/2006 | Fukuzo |
| 2007/0028027 A1 | 2/2007 | Janzen et al. |
| 2007/0028134 A1 | 2/2007 | Gammel et al. |
| 2007/0043769 A1 | 2/2007 | Kasahara et al. |
| 2007/0055814 A1 | 3/2007 | Jeddeloh |
| 2007/0094430 A1 | 4/2007 | Speier et al. |
| 2007/0063866 A1 | 5/2007 | Webb |
| 2007/0112863 A1 | 5/2007 | Niwata et al. |
| 2007/0150752 A1 | 6/2007 | Kudelski |
| 2007/0174362 A1 | 7/2007 | Pham et al. |
| 2007/0180263 A1 | 8/2007 | Delgrosso et al. |
| 2007/0180493 A1 | 8/2007 | Croft et al. |
| 2007/0203970 A1 | 8/2007 | Nguyen |
| 2007/0204140 A1 | 8/2007 | Shade |
| 2007/0258595 A1 | 11/2007 | Choy |
| 2007/0283297 A1 | 12/2007 | Hein et al. |
| 2008/0005325 A1 | 1/2008 | Wynn et al. |
| 2008/0059379 A1 | 3/2008 | Ramaci et al. |
| 2008/0065837 A1 | 3/2008 | Toyonaga et al. |
| 2008/0066192 A1 | 3/2008 | Greco et al. |
| 2008/0082835 A1 | 4/2008 | Asher et al. |
| 2008/0120511 A1 | 5/2008 | Naguib |
| 2008/0144821 A1 | 6/2008 | Armstrong |
| 2008/0155273 A1 | 6/2008 | Conti |
| 2008/0209216 A1 | 8/2008 | Kelly et al. |
| 2008/0244743 A1 | 10/2008 | Largman et al. |
| 2008/0263672 A1 | 10/2008 | Chen et al. |
| 2008/0288790 A1 | 11/2008 | Wilson |
| 2009/0019325 A1 | 1/2009 | Miyamoto et al. |
| 2009/0319773 A1 | 12/2009 | Frenkel et al. |
| 2009/0328183 A1 | 12/2009 | Frenkel et al. |
| 2010/0275039 A1 | 10/2010 | Frenkel et al. |
| 2010/0278339 A1 | 11/2010 | Frenkel et al. |
| 2010/0324380 A1 | 12/2010 | Perkins et al. |
| 2011/0026523 A1* | 2/2011 | Charzinksi ............ H04L 45/00 370/392 |
| 2011/0107023 A1 | 5/2011 | McCallister et al. |
| 2011/0202772 A1 | 8/2011 | Frenkel et al. |
| 2011/0213990 A1 | 9/2011 | Poisner |
| 2011/0276699 A1 | 11/2011 | Pedersen |
| 2012/0198225 A1 | 8/2012 | Gadouche et al. |
| 2013/0024700 A1 | 1/2013 | Peterson et al. |
| 2013/0179685 A1 | 7/2013 | Weinstein et al. |
| 2014/0020109 A1* | 1/2014 | Mraz ................ H04L 63/0428 726/26 |
| 2014/0040679 A1 | 2/2014 | Shimizu et al. |
| 2014/0068712 A1 | 3/2014 | Frenkel et al. |
| 2014/0122965 A1 | 5/2014 | Zeng et al. |
| 2014/0282215 A1 | 9/2014 | Grubbs et al. |
| 2014/0317753 A1* | 10/2014 | Frenkel ................ H04L 63/10 726/26 |
| 2015/0135264 A1 | 5/2015 | Amiga |
| 2017/0201379 A1* | 7/2017 | Frenkel ............... H04L 63/126 |

FOREIGN PATENT DOCUMENTS

| | | | |
|---|---|---|---|
| GB | 2371125 A | 7/2002 | |
| WO | 9526085 A1 | 9/1995 | |
| WO | 0110079 A1 | 2/2001 | |
| WO | 01/63879 A1 | 8/2001 | |
| WO | WO-2008001344 A2 * | 1/2008 | ........... G06F 21/567 |
| WO | 2008072234 A2 | 6/2008 | |
| WO | WO-2008087640 A2 * | 7/2008 | ......... H04L 63/0485 |
| WO | WO-2009053990 A2 * | 4/2009 | ............ H04N 5/232 |
| WO | 2010049839 A2 | 5/2010 | |

OTHER PUBLICATIONS

Innominate Security Technologies, "Press Release: Innominate joins Industrial Defender Enabled Partner Program", Germany, 2 pages, Apr. 14, 2008 (http://www.innominate.com/content/view/288/120/lang,en/).

Frenkel, L., "Unidirectional Information Transfer", Web issue, 1 page, Jun. 2005.

Dierks, T., "The TLS Protocol", version 1.0, RFC 2246, Networking Group of IETF, 71 pages, Jan. 1999.

Waterfall Security Solutions Ltd., "Waterfall One Way Link Technology", 1 page, year 2008 ( http://www.waterfall-solutions.com/home/Waterfall.sub.--Technology.a- spx).

Msisac, "Cyber Security Procurement Language for Control Systems", version 1.8, revision 3, 120 pages, Feb. 2008 (http://www.msisac.org/scada/documents/4march08scadaprocure.pdf).

Axis Communications, "Axis Network Cameras", 8 pages, year 2008 (http://www.axis.com/products/video/camera/index.htm).

Check Point Software Technologies Ltd., "Extended Unified Threat Management capabilities with new multi-layer messaging security deliver best all-inclusive security solution", USA, 3 pages, Nov. 18, 2008 (http://www.checkpoint.com/press/2008/utm-1-edge-upgrade-111808.html).

Einey, D., "Waterfall IP Surveillance Enabler", 14 pages, Jul. 2007.

U.S. Appl. No. 15/806,375 office action dated Mar. 22, 2018.

U.S. Appl. No. 15/458,044 office action dated May 23, 2018.

* cited by examiner

SECURE CONNECTION WITH PROTECTED FACILITIES

CROSS-REFERENCE TO RELATED APPLICATION

This application claims the benefit of U.S. Provisional Patent Application 62/295,074, filed Feb. 14, 2016, which is incorporated herein by reference

FIELD OF THE INVENTION

The present invention relates generally to digital communications and control, and particularly to systems and methods for secure communications.

BACKGROUND

In a computer network handling sensitive data or physical processes, portions of the network may be connected by one-way links. The term "one-way link" is used in the context of the present patent application and in the claims to refer to a communication link that is physically configured to carry signals in one direction and to be incapable of carrying signals in the opposite direction. One-way links may be implemented, for example, using Waterfall® systems, which are manufactured by Waterfall Security Solutions, Ltd. (Rosh HaAyin, Israel). The Waterfall system provides a physical one-way connection based on fiberoptic communication, using an underlying proprietary transfer protocol. When a transmitting computer is connected by a Waterfall system (or other one-way link) to a receiving computer, the receiving computer can receive data from the transmitting computer but has no physical means of sending any return communications to the transmitting computer.

One-way links may be used to prevent data either from entering or leaving a protected facility. For example, confidential data that must not be accessed from external sites may be stored on a computer that is configured to receive data over a one-way link and has no physical outgoing link over which data might be transmitted to an external site. On the other hand, in some applications, the operator of the protected facility may be prepared to allow data to exit the facility freely via a one-way link, while preventing data from entering the facility in order to thwart hackers and cyber-terrorists. Unlike conventional firewalls, one-way links permit information to leave a protected facility without risk to the safety or availability of the network in the facility due to attacks originating on an external network. In practice, however, there is sometimes a need to transmit at least small amounts of information from an external network back into the protected facility.

U.S. Patent Application Publication 2014/0068712, whose disclosure is incorporated herein by reference, describes apparatus and methods for automatically controlling inputs to a protected destination. In a disclosed embodiment, communication apparatus includes a one-way, hardware-actuated data relay, which includes a first hardware interface configured to receive a command from a communications network and a second hardware interface configured to convey the received command to a protected destination when the relay is actuated. A decoder includes a third hardware interface configured to receive a digital signature for the command from the communications network and hardware decoding logic coupled to verify the digital signature and to actuate the relay upon verifying the digital signature, whereby the command is conveyed via the second hardware interface to the protected destination.

U.S. Patent Application Publication 2016/0112384, which is assigned to the assignee of the present patent application and whose disclosure is incorporated herein by reference, describes a method for communication that includes receiving in a secure installation via a network from a remote user terminal an input comprising a stream of symbols that has been encrypted using a preselected encryption key. The encrypted stream of symbols is decoded in the secure installation using a decryption key corresponding to the preselected encryption key, to produce a clear stream of symbols. A computer program running on a processor in the secure installation is used in processing the symbols in the clear stream and generating a graphical output in a predefined display format in response to processing the symbols. The graphical output is outputted from the secure installation to the network in an unencrypted format for display on the remote user terminal.

SUMMARY

Embodiments of the present invention that are described hereinbelow provide apparatus and methods for secure communication with a protected installation.

There is therefore provided, in accordance with an embodiment of the invention, a system for communication, which includes a station, including first and second interfaces configured to be connected to a packet data network and to have different, respective first and second network addresses, and a terminal, including third and fourth interfaces configured to be connected to the packet data network and to have different, respective third and fourth network addresses. The station is configured to transmit first data to the terminal over a first path through the packet data network directed from the first interface to the third network address, while the terminal is configured to transmit second data to the station over a second path through the packet data network directed from the fourth interface to the second network address. First and second Transmission Control Protocol (TCP) proxies are deployed respectively in the station and in the terminal, and are configured to emulate a TCP connection between the station and the terminal by transmitting TCP frames from the station to the terminal only over the first path and from the terminal to the station only over the second path.

In some embodiments, the station includes a first outgoing one-way link connected between the first TCP proxy and the first interface and a first incoming one-way link connected between the second interface and the first TCP proxy. In a disclosed embodiment, the terminal includes a second outgoing one-way link connected between the second TCP proxy and the fourth interface and a second incoming one-way link connected between the third interface and the second TCP proxy.

Additionally or alternatively, the station includes first and second switches, which are coupled between the outgoing and incoming one-way links and the first TCP proxy and are configured to connect the first TCP proxy to the packet data network via the outgoing and incoming one-way links only when the emulated TCP connection is in use. Typically, the station includes a host computer, which is configured to transmit and receive data packets to and from the packet data network via the outgoing and incoming one-way links, respectively, and which is coupled to the first TCP proxy so as to transmit and receive data over the emulated TCP connection. The first and second switches are configured to isolate the first TCP proxy when the emulated TCP connection is not in use and to convey incoming data packets from the incoming one-way link to the host computer and convey outgoing data packets from the computer to the outgoing one-way link, bypassing the first TCP proxy. In a disclosed embodiment, the station includes a hardware security module (HSM), which is coupled to control actuation of the switches.

Further additionally or alternatively, the terminal includes a secure protocol support module, including a hardware security module (HSM) on which the second TCP proxy runs. In some embodiments, actuation of the HSM to emulate the TCP connection is conditioned on presentation of a hardware credential to the HSM.

In some embodiments, the secure protocol support module includes a first switch, which is coupled between the third interface and the HSM, and a second switch, which coupled between the fourth interface and the HSM, and wherein the first and second switches are configured to connect the HSM to the packet data network via the third and fourth interfaces only when the emulated TCP connection is in use. In a disclosed embodiment, the terminal includes a host processor, which is configured to receive and transmit data packets from and to the packet data network via the third and fourth interfaces, respectively, and which is coupled to the HSM so as to transmit and receive data over the emulated TCP connection. The first and second switches are configured to isolate the second TCP proxy when the emulated TCP connection is not in use and to convey incoming data packets from the third interface to the host processor and convey outgoing data packets from the host processor to the fourth interface, bypassing the HSM.

There is also provided, in accordance with an embodiment of the invention, a method for communication, which includes connecting a station to a packet data network through first and second interfaces having different, respective first and second network addresses, and connecting a terminal to the packet data network through third and fourth interfaces having different, respective third and fourth network addresses. A Transmission Control Protocol (TCP) connection between the station and the terminal is emulated by transmitting first TCP frames from a first TCP proxy deployed in the station to a second TCP proxy deployed in the terminal only over a first path through the packet data network directed from the first interface to the third network address, and transmitting second TCP frames from the second TCP proxy in the terminal to the first TCP proxy in the station only over a second path through the packet data network directed from the fourth interface to the second network address.

The present invention will be more fully understood from the following detailed description of the embodiments thereof, taken together with the drawings in which:

DETAILED DESCRIPTION OF EMBODIMENTS

Figure 1:
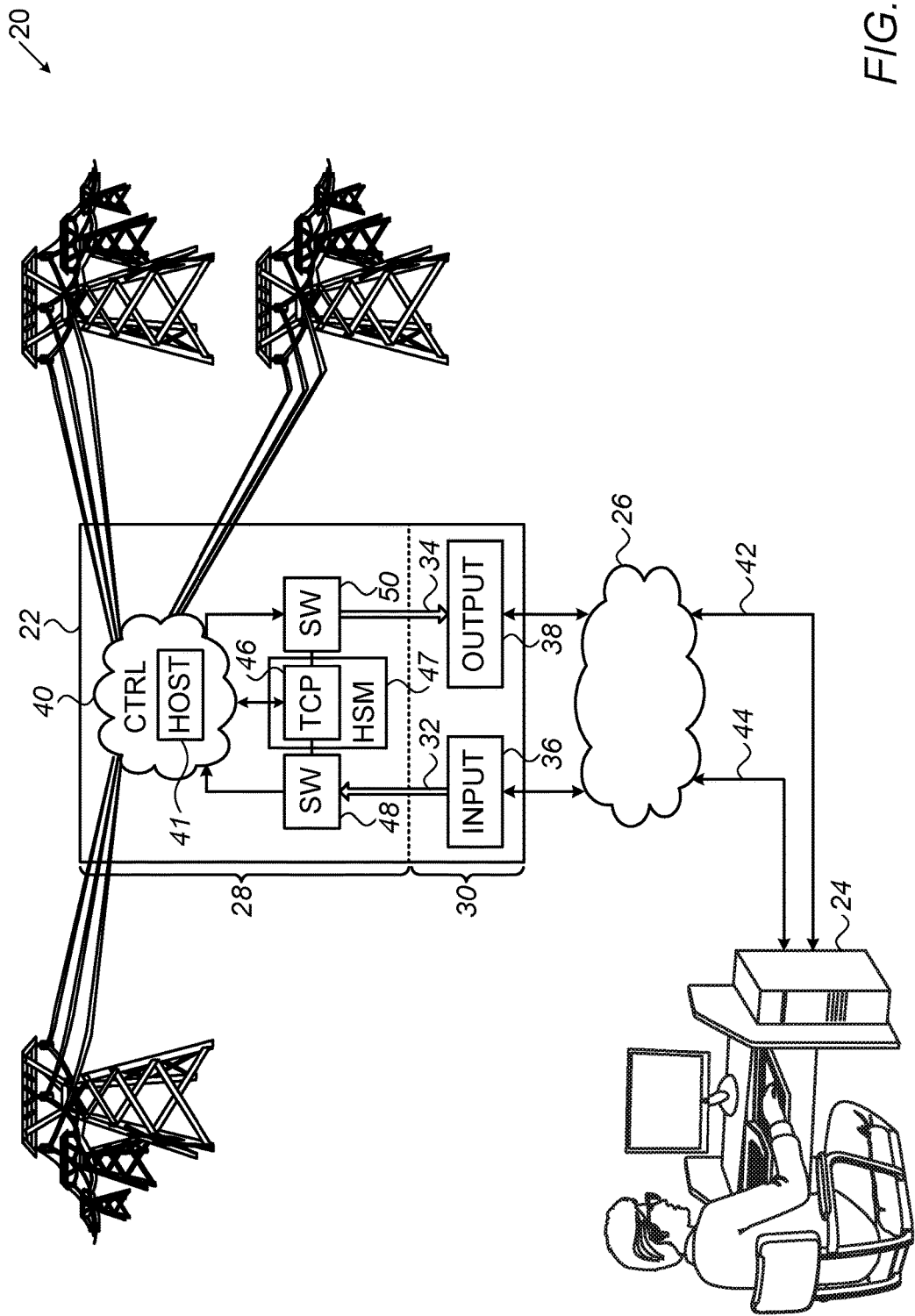
FIG. 1 is a block diagram that schematically illustrates a system for secure monitoring and control, in accordance with an embodiment of the present invention.

As noted earlier, at outgoing one-way link from a protected facility is an effective means for allowing information to leave a protected facility without risk to the safety or availability of the network in the facility due to attacks originating on an external network. In practice, however, there is sometimes a need to transmit at least small amounts of information from an external network back into the protected facility, such as commands, software updates or configuration changes to remote unattended sites or manufacturing facilities. There are a number of risks associated with such communications. One risk is that if malware has somehow been introduced into the protected network (possibly by insider collaboration), communications back into the protected network could be used to trigger an attack. Another risk is that an attacker might gain remote control capabilities over a system within the protected network or might use the communications channel into the facility to cause unsafe or unreliable conditions in the protected network, by means of a buffer overflow attack, for instance.

The above-mentioned U.S. Patent Application Publication 2014/0068712 describes a possible solution to these problems, by permitting a controlled flow of small amounts of information into a protected network. The flow is automatically controlled so that software-based attacks on protected equipment become difficult or impossible to carry out, even if parts of the command and communications system themselves become compromised. In contrast to conventional firewalls, the control is carried out by hardware logic, rather than software. Consequently, remote attackers are unable to change the operating configuration of the protection logic or to cause it to perform any function other than those initially programmed by the logic designer. In the disclosed embodiments, the hardware logic is configured to control the format and content of commands that can be sent to a protected destination. The hardware logic may also authenticate these commands to ensure they were produced by an authorized transmitter. As a result, by compromising an authorized transmitter, an attacker may, at worst, be able to send an incorrect command to the destination, but will not be able to gain control over the protected facility.

U.S. Patent Application Publication 2016/0112384, also cited above, takes this model a step farther to provide secure remote desktop functionality, while maintaining a high level of security against unauthorized access. These embodiments use hardware components to separate the input from a remote user terminal to the secure installation from the graphical display output that is provided by the installation, and thus avoid creating a closed communication loop that could be exploited by a malicious party. The input to the secure installation comprises a stream of symbols that has been encrypted by the remote user terminal using a preselected encryption key. A decoder in the secure installation converts the encrypted input back into a clear stream of symbols, using a corresponding decryption key. Thus, the remote desktop functionality of the secure installation can be accessed only by a client device that is in possession of the proper encryption key. For enhanced security, the encrypted symbol stream may be generated using a hardware-based encoder in a secure input device of the remote user terminal.

The sorts of remote control functionality that are described in the above publications rely on the human operator of the user terminal to "close the loop" between the information received by the terminal from the protected facility and the input transmitted from the terminal back to the facility. The input stream to the protected facility is transmitted from one port of the user terminal to a corresponding port of the protected facility via a given network path, while the display output typically traverses a different network path between a different pair of ports. (The separation of the ports is enforced at the protected facility, and the paths are determined independently by routers in the network between the terminal and the protected facility, such as Internet Protocol [IP] routers.) This segregation of the two communication directions alleviates many of the security risks that would otherwise be involved in bidirectional interaction with the protected facility, since it prevents the establishment of process-to-process protocol connections, such as Transmission Control Protocol (TCP) sockets, that are generally required for client/server and peer-to-peer interactions.

In some cases, however, an actual bidirectional protocol connection is required between the protected facility and a remote terminal or other computer. Such a connection may be needed, for example, in order to update software running at the protected facility, both during the update and afterwards, to enable verification of proper operation, particularly when the facility is in a remote location without skilled personnel (or possibly without any personnel) on site. A bidirectional connection can also be needed in emergency situations, so that headquarters can exert full, direct, and unrestricted control of the site for operational and safety reasons.

Embodiments of the present invention that are described herein enable the creation of a bidirectional protocol connection over a pair of separate, unidirectional legs through a network, while maintaining a high level of hardware-based protection against malicious exploitation of the connection. These embodiments are based on a TCP proxy, which is capable of opening and maintaining a TCP connection with a remote peer while receiving incoming TCP packets from the peer on an input port with a given Internet Protocol (IP) address and transmitting outgoing TCP packets to the remote peer via an output port with a different IP address. The TCP proxy emulates the operation of TCP over a conventional, bidirectional IP port, so that software applications running on a host processor at either end of the TCP connection can transmit and receive communications via the TCP proxy as though it was a conventional TCP software stack.

Such TCP proxies can be installed at one or both ends of the TCP link, for example, both in a protected facility and in a remote user terminal that communicates with the facility. For enhanced security, the TCP proxy can be installed and run within attack-resistant hardware modules, such as a hardware security module (HSM). As an additional or alternative security measure, the TCP proxy receives the incoming packets from the input port via an incoming one-way link and transmits the outgoing packets to the output port via a separate, outgoing one-way link.

In an example embodiment that is described further hereinbelow, one such TCP proxy is installed in a protected, secure facility, and the other in a remote user terminal. In normal operation of this system, as explained above, the secure facility transmits data to the user terminal over one unidirectional path through a network, while the user terminal transmits instructions to the secure facility over a separate unidirectional path, with segregation enforced by one-way links in both the secure facility and the user terminal. During such normal operation, the TCP proxies are isolated from the one-way links, and hence from the network, by hardware-enforced switching circuits.

For example, connection of the TCP proxies to the network may be subject to actuation by a hardware security model (HSM) at the user terminal, which may be either the same HSM in which the TCP proxy itself runs or a separate HSM that is provided for this purpose. As a result, the TCP connection to the secure facility will be available only when physically actuated by a user of the terminal with the required cryptographic hardware credentials, and the connection is not exposed at any other time to exploitation by attackers elsewhere on the network. When the HSM is not activated, the TCP proxy code itself is encrypted and inaccessible from the network, and thus cannot be exploited to open the bidirectional connection between the user terminal and the secure facility in the absence of authorized personnel with the necessary cryptographic credentials.

FIG. 1 is a block diagram that schematically illustrates a system 20 for secure monitoring and control, in accordance with an embodiment of the present invention. In this example, system 20 comprises a user terminal 24, which is used to monitor and control a secure facility, for example a utility control station 22, such as a transmission and switching station of an electric power utility. Terminal 24 communicates with station 22 via a wide-area network 26, which may comprise any suitable wired or wireless network, or a combination of such networks, including public networks, such as the public Internet. Station 22 typically comprises an internal control network 40, which includes operational elements, such as switches, which make, break and adjust power connections, as well as monitoring components, such as sensors. Although for the sake of simplicity, only a single station 22 is shown in FIG. 1, in practice utilities generally operate many such stations. In many actual systems, stations 22 are unmanned, and are monitored and controlled remotely, using a single outgoing link to transmit data for monitoring. In the present embodiment, station 22 is controlled by remote user terminal 24, and offers TCP proxy functionality when required for this purpose, as described herein.

Although the pictured example relates, by way of illustration, to an electric power utility, the principles of the present invention are not limited to this particular operating context. Rather, the apparatus and methods that are described below may be applied to utilities of other types (such as gas or water utilities, for instance), as well as in industrial environments and substantially any other application in which tight control is to be exercised over data and commands that may be input to a protected installation. Station 22 is just one example of such an installation. Certain embodiments of the present invention are described hereinbelow, for the sake of clarity and without limitation, with respect to the elements of system 20, but the principles of these embodiments and the techniques that they incorporate may similarly be applied in other operating environments in which an installation is to be protected from undesired data input and unauthorized access.

Station 22 is typically designed as a closed, secure facility, protected physically against unauthorized entry. A host computer 41 in station 22 inputs commands to the switches on network 40 and monitors the operation of the switches and other components of the station. Typically, network 40 comprises multiple sensors and actuators, which are distributed throughout station 22 and report via a secure internal network to host computer 41. Computer 41 outputs information, possibly including a graphical display output, via a one-way link 34 to an output interface 38. Output interface 38 is connected to network 26, which conveys the output information to terminal 24. One-way link 34 connects a secure zone 28, containing the protected components of station 22, to a buffer zone 30, which is accessible to network 26. Although output interface 38 typically comprises a conventional, bidirectional network port, one-way link 34 prevents any sort of access to secure zone 28 via output interface 38.

One-way link 34 conveys output information from station 22 to network 26 but is physically incapable of conveying input data from the network to the station. For this latter purpose, station 22 comprises a secure input 36, which typically has an input interface coupled to network 26 and another interface to the protected elements of the station. In this example, secure input 36 receives and decodes a stream of symbols (typically encrypted symbols) transmitted by terminal 24 over network 26, and conveys the decoded symbols over a one-way link 32 to host computer 41. Details of the structure and operation of secure input 36 are described further, for example, in the above mentioned U.S. Patent Application Publication 2016/01123844. Host computer 41 particularly and secure zone 28 in general receive no inputs from network 26 other than via input 36 and one-way link 32, which are typically contained in station 22 and are thus themselves protected from physical and electrical tampering.

Terminal 24 receives data output by station 22 through output 38 via an output path 42 through network 26, and inputs data, such as commands and/or queries, to station 22 via a separate input path 44 to input 36. As noted earlier, input 36 and output 38 typically comprise separate and independent ports to network 26, with their own, different network addresses, such as IP addresses. Paths 42 and 44 are thus established separately by routers (not shown) in network 26. Terminal 24 is similarly configured with separate input and output interfaces, as is shown and described hereinbelow with reference to FIG. 2.

When it is necessary to transmit connection-oriented traffic to and from computer 41 in station 22, a TCP proxy 46 in the station is actuated. Typically, TCP proxy 46 comprises a processor, which is separate from computer 41 and has suitable interfaces and software to carry out the functions that are described herein. In normal operation of station 22, switches 48 and 50, typically hardware-actuated data switches, isolate TCP proxy 46 from network 26, so that all inputs from one-way link 32 to host computer 41 and other elements of internal control network 40, as well as outputs from computer 41 and network 40 to one-way link 34, bypass the TCP proxy.

When a TCP connection with remote terminal 24 is invoked, however, switches 48 and 50 are actuated to connect one-way links 32 and 34 to and from TCP proxy 46, which can then begin TCP emulation. Typically, TCP proxy 46 runs on a hardware security module (HSM) 47 installed in secure zone 28, to prevent tampering and attacks. Additionally or alternatively, TCP proxy 46 and/or switches 48 and 50 comprise other authentication components and software, such as a trusted platform module (TPM). The use of such secure hardware ensures that the switches are actuated and a TCP connection can be set up with terminal 24 only after the user of the terminal has been properly authenticated.

HSM 47 (and similarly an HSM used for the TCP proxy in terminal 24, as described below) typically comprises a software-driven processor, such as a central processing unit (CPU), with a memory and suitable communication interfaces for receiving and transmitting TCP data frames from and to switches 48 and 50. For these purposes, HSM 47 can comprise a commercially-available hardware subsystem, such as the IBM PCIe Cryptographic Coprocessor, which is a tamper-responding, programmable, cryptographic PCIe® card, containing a CPU, encryption hardware, RAM, persistent memory, a hardware random number generator, clock, infrastructure firmware, and software. The software running in the CPU is customized, in the present embodiment, to include the TCP proxy stack and interface. Thus, as noted earlier, the proxy code itself is actually never actually accessible from network 26. The code is held in the HSM memory in encrypted form and is activated and decrypted, to run on the HSM CPU, only after proper authentication. Because the code runs only internally within the secure execution environment of HSM 47, even when TCP proxy 46 is activated, it is not possible to copy the code to use it from another computer on the network.

Figure 2:
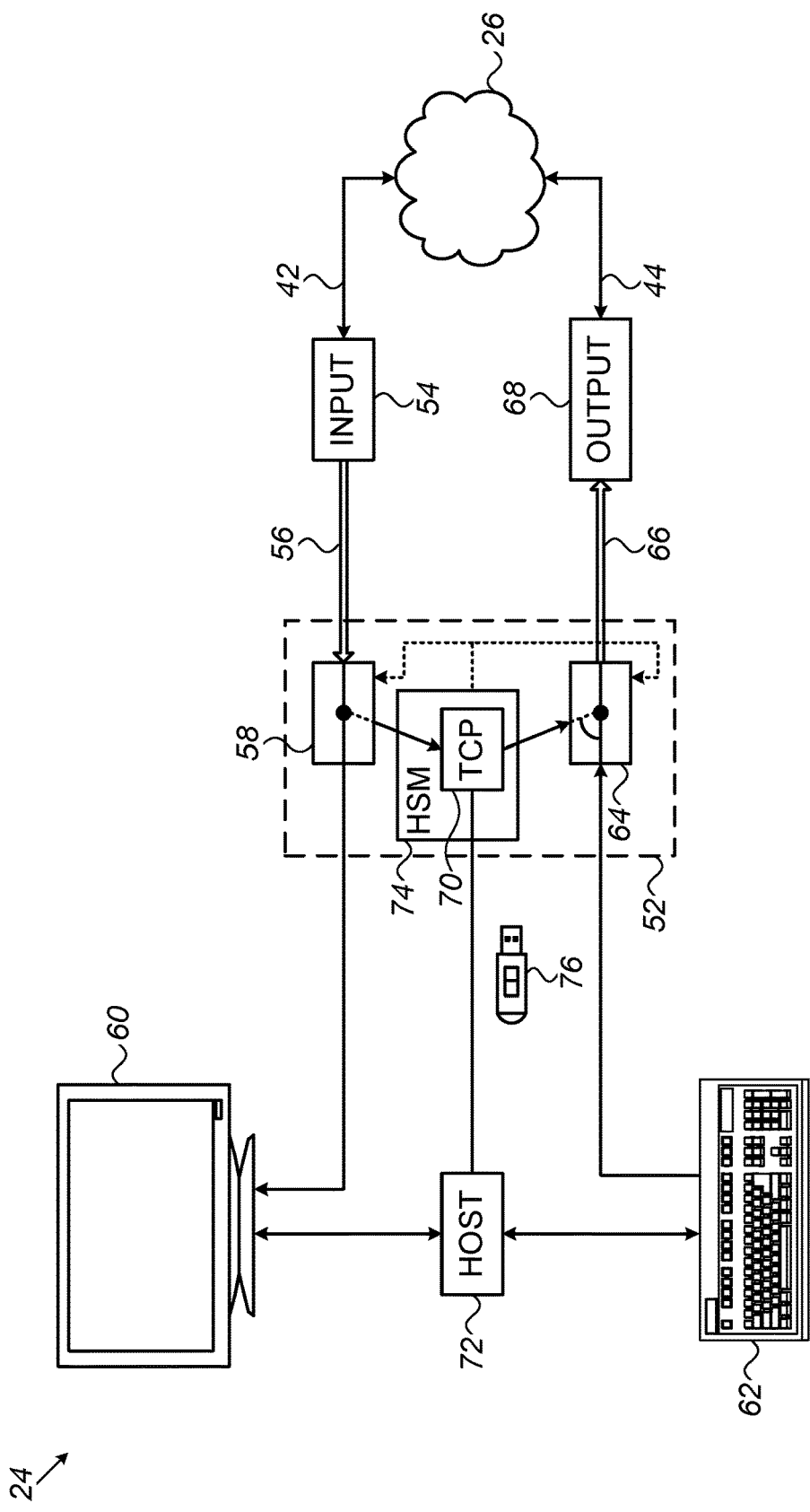
FIG. 2 is a block diagram that schematically shows details of remote user terminal, in accordance with an embodiment of the present invention.

FIG. 2 is a block diagram that schematically shows details of remote user terminal 24, in accordance with an embodiment of the present invention. In the pictured embodiment, terminal 24 comprises a user interface, comprising a secure input device 62 and a display 60, which are physically and functionally separate elements. The special, secure input device and display are useful in routine operations of terminal 24, when full, two-way TCP communication is not needed. These secure components are not required when terminal 24 operates only in a monitoring mode, without inputting data or commands to station 22, nor are they needed when the TCP proxies are in use (in which case a conventional user input device and display are sufficient). Secure input device 62 and display 60 are described here, however, along with one-way links 56 and 66, for the sake of completeness in demonstrating a full-featured, multi-capability user terminal.

Secure input device 62, such as a keyboard, mouse, or other user-operated element, receives inputs from an operator of terminal 24 and encodes these inputs as an encrypted symbol stream using a preselected encryption key. One-way link 66 conveys the encrypted output from device 62 to an output interface 68 of terminal 24.

Output interface 68 transmits the encrypted symbol stream from input device 62 via input path 44 over network 26 to input 36, which decodes the symbols and thus provides a corresponding clear symbol stream to host computer 41. Output interface 68 may, for example, establish a secure connection (such as a Transport Layer Security [TLS] encrypted connection, as is known in the art) with input 36 over network 26. This sort of conventional data security measure adds a further layer of protection to the operation of the other security measures described herein. This connection, however, which is set up between the IP addresses of output interface 68 and input 36, carries only the information that is output from terminal 24 via one-way link 66 (and possibly acknowledgment packets from input 36), while one-way links 66 and 32 prevent any meaningful data from reaching terminal 24 via the connection.

Typically, although not necessarily, input device 62 encrypts the operator inputs using hardware logic and holds the encryption key in a memory (not shown) that is inaccessible to the user of terminal 24. This key may similarly be inaccessible to a host processor 72 that is used in running software-based functions of the terminal. For the purpose of these software-based functions (including applications running over TCP connections to station 22), input device 62 may have an additional, non-encrypted mode of operation. Alternatively, one or more additional input devices (not shown) may be connected to terminal 24, or if terminal 24 is configured to send input to station 22 only over a secure TCP connection, input device 62 may be replaced by an ordinary, non-encrypting input device.

In parallel to the operation of input path 44 that is described above, an input interface 54 of terminal 24 receives data output generated by station 22 and transmitted over output path 42 through network 26 via output 38. Input interface 54 conveys the data via one-way link 56 to display 60, which presents the data in alphanumeric and/or graphical form. For these purposes, input interface 54 typically comprises a network interface controller (NIC), coupled to transmit and receive packets to and from network 26, along with a suitable communication controller for transmitting data over one-way link 56 and a suitable buffer memory and logic circuits (hardware or software-driven) connecting them. These functions may be carried out, for example, by a Waterfall unidirectional gateway.

As noted earlier, in normal operation of terminal 24, input path 44 from output interface 68 of terminal 24 to station 22 and output path 42 from station 22 to display 60 are separate and independent, without any electronic interaction between these paths within terminal 24. Input interface 54 may establish an additional secure connection (such as a TLS connection) with output 38 over network 26, which is separate from the connection between output interface 68 and input 36. The only actual connection that normally exists between input and output paths 44 and 42 is the cognitive connection made by the operator of terminal 24.

As explained above, however, the operator of terminal 24 may occasionally need to interact with computer 41 in station 22 using a connection-based client/server or peer-to-peer application. For this purpose, terminal 24 comprises a secure protocol support module 52 with a TCP proxy 70, which interacts with TCP proxy 46 in station 22 when actuated. As on the station side, TCP proxy 70 comprises a processor, which is separate from host processor 72 and has suitable interfaces and software to carry out the functions that are described herein. Module 52, including TCP proxy 70 and switches 58 and 64, is typically implemented as a secure, tamper-proof hardware unit, which is hardened against unauthorized use and disassembly. TCP proxy 70 may be connected to and communicate with host processor 72 via a suitable bus, such as a PCIe bus.

Within module 52, at least TCP proxy 70 runs on an HSM 74, similar to HSM 47 that was described above. Actuation of HSM 74 is conditioned, for example on insertion by the user of a suitable key 76, such as a smartcard or SIM, or presentation of other hardware credentials, possibly accompanied by other security measures, such as password and/or biometric authentication of the user. For further enhanced security, HSM 74 can require the user to present a further key to activate the TCP proxy software, in addition to the key used to activate the HSM.

Key 76 typically holds one or more private cryptographic keys. These keys are used by HSM 74 to send activation commands to HSM 47, and cause HSMs 47 and 74 to activate the proxy code (including decryption of the stored code using the key) and run the code within the secure execution facility of the HSMs.

In normal operation of terminal 24, when HSM 74 is not actuated, switches 58 and 64 isolate TCP proxy 70 from network 26, so that all input from one-way link 56 and output to one-way link 66 bypass the TCP proxy. When HSM 74 is actuated and a TCP connection is invoked, however, switches 58 and 64 operate to connect one-way links 56 and 66 to and from TCP proxy 70, which can then begin TCP emulation. For this purpose, TCP proxy 70 also instructs switches 48 and 50 in station 22 to connect TCP proxy 46 to input 36 and output 38, as described above. Typically, the instruction to switches 48 and 50 is accompanied by cryptographic credentials, which are provided by HSM 74, for example, which enable the controller responsible in station 22 to authenticate the instruction before actuating the switches.

Alternatively, HSM 74 may be solely responsible for data security in terminal 24. In this case, switches 58 and 64 may be actuated manually by the operator of terminal 24, or they may be eliminated entirely. (Switches 48 and 50 in station 22, however, still provide a useful added measure of security.) Additionally or alternatively, one-way links 56 and 66 in terminal 24 may be replaced by one or more ordinary duplex connections, while maintaining the use of one-way links 32 and 34 to protect station 22 from unauthorized access.

In any case, once HSMs 47 and 74 have been activated, as described above, TCP proxies 70 and 46 then communicate with one another in order to initiate and set up TCP socket emulation. The interaction between the TCP proxies is similar to that between conventional TCP endpoints, except that in the present case, TCP frames are transmitted from TCP proxy 70 to TCP proxy 46 over input path 44 and from TCP proxy 46 to TCP proxy 70 over output path 42. As explained earlier, the endpoints of input path 44 have different IP addresses from the endpoints of output path 42. Once the emulated TCP connection is set up and running, TCP proxies 46 and 70 notify the respective hosts 41 and 72 that the connection is available, so that the desired application can run.

Typically, all communication between TCP proxies 46 and 70 is signed by keys. Thus, when key 76 is removed, system 20 defaults to a "no proxy" state, in which HSMs 47 and 74 are inaccessible, and switches connecting the TCP proxies to network 26 are locked. Additionally or alternatively, TCP proxies 46 and 70 regularly exchange authorization messages, and shut down if an authorization message does not arrive when expected.

The elements of station 22 and terminal 24 are shown in the figures and described above in terms of separate functional blocks solely for the sake of convenience and conceptual clarity. In practical implementations, two or more of these blocks may be combined in a single circuit element or, additionally or alternatively, certain blocks may be broken down into separate sub-blocks and circuits. All such embodiments are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A system for communication, comprising:
a station, comprising first and second interfaces configured to be connected to a packet data network and to have different, respective first and second network addresses;
a terminal, comprising third and fourth interfaces configured to be connected to the packet data network and to have different, respective third and fourth network addresses,
wherein the station is configured to transmit first data to the terminal over a first path through the packet data network directed from the first interface to the third network address, while the terminal is configured to transmit second data to the station over a second path through the packet data network directed from the fourth interface to the second network address; and first and second Transmission Control Protocol (TCP) proxies, which are deployed respectively in the station and in the terminal, and are configured to emulate a TCP connection between the station and the terminal by transmitting TCP frames from the station to the terminal only over the first path and from the terminal to the station only over the second path, wherein the station comprises a first outgoing one-way link connected between the first TCP proxy and the first interface and a first incoming one-way link connected between the second interface and the first TCP proxy.

2. The system according to claim 1, wherein the terminal comprises a second outgoing one-way link connected between the second TCP proxy and the fourth interface and a second incoming one-way link connected between the third interface and the second TCP proxy.

3. The system according to claim 1, wherein the station comprises first and second switches, which are coupled between the outgoing and incoming one-way links and the first TCP proxy and are configured to connect the first TCP proxy to the packet data network via the outgoing and incoming one-way links only when the emulated TCP connection is in use.

4. The system according to claim 3, wherein the station comprises a host computer, which is configured to transmit and receive data packets to and from the packet data network via the outgoing and incoming one-way links, respectively, and which is coupled to the first TCP proxy so as to transmit and receive data over the emulated TCP connection, wherein the first and second switches are configured to isolate the first TCP proxy when the emulated TCP connection is not in use and to convey incoming data packets from the incoming one-way link to the host computer and convey outgoing data packets from the computer to the outgoing one-way link, bypassing the first TCP proxy.

5. The system according to claim 4, wherein the station comprises a hardware security module (HSM), which is coupled to control actuation of the switches.

6. A system for communication, comprising:

a station, comprising first and second interfaces configured to be connected to a packet data network and to have different, respective first and second network addresses;

a terminal, comprising third and fourth interfaces configured to be connected to the packet data network and to have different, respective third and fourth network addresses, wherein the station is configured to transmit first data to the terminal over a first path through the packet data network directed from the first interface to the third network address, while the terminal is configured to transmit second data to the station over a second path through the packet data network directed from the fourth interface to the second network address; and first and second Transmission Control Protocol (TCP) proxies, which are deployed respectively in the station and in the terminal, and are configured to emulate a TCP connection between the station and the terminal by transmitting TCP frames from the station to the terminal only over the first path and from the terminal to the station only over the second path, wherein the terminal comprises a secure protocol support module, comprising a hardware security module (HSM) on which the second TCP proxy runs.

7. The system according to claim 6, wherein actuation of the HSM to emulate the TCP connection is conditioned on presentation of a hardware credential to the HSM.

8. The system according to claim 6, wherein the secure protocol support module comprises a first switch, which is coupled between the third interface and the HSM, and a second switch, which coupled between the fourth interface and the HSM, and wherein the first and second switches are configured to connect the HSM to the packet data network via the third and fourth interfaces only when the emulated TCP connection is in use.

9. The system according to claim 8, wherein the terminal comprises a host processor, which is configured to receive and transmit data packets from and to the packet data network via the third and fourth interfaces, respectively, and which is coupled to the HSM so as to transmit and receive data over the emulated TCP connection, wherein the first and second switches are configured to isolate the second TCP proxy when the emulated TCP connection is not in use and to convey incoming data packets from the third interface to the host processor and convey outgoing data packets from the host processor to the fourth interface, bypassing the HSM.

10. A method for communication, comprising:

connecting a station to a packet data network through first and second interfaces having different, respective first and second network addresses;

connecting a terminal to the packet data network through third and fourth interfaces having different, respective third and fourth network addresses; and emulating a Transmission Control Protocol (TCP) connection between the station and the terminal by transmitting first TCP frames from a first TCP proxy deployed in the station to a second TCP proxy deployed in the terminal only over a first path through the packet data network directed from the first interface to the third network address, and transmitting second TCP frames from the second TCP proxy in the terminal to the first TCP proxy in the station only over a second path through the packet data network directed from the fourth interface to the second network address, wherein connecting the station comprises connecting a first outgoing one-way link between the first TCP proxy and the first interface and a connecting first incoming one-way link between the second interface and the first TCP proxy.

11. The method according to claim 10, wherein connecting the terminal comprises connecting a second outgoing one-way link connected between the second TCP proxy and the fourth interface and connecting a second incoming one-way link between the third interface and the second TCP proxy.

12. The method according to claim 10, wherein connecting the station further comprises actuating first and second switches, coupled respectively between the outgoing and incoming one-way links and the first TCP proxy, so as to connect the first TCP proxy to the packet data network via the outgoing and incoming one-way links only when the emulated TCP connection is in use.

13. The method according to claim 12, and comprising transmitting and receiving data packets by a host computer in the station to and from the packet data network via the outgoing and incoming one-way links, respectively, and coupling the host computer to the first TCP proxy so as to transmit and receive data over the emulated TCP connection, wherein the first and second switches are configured to isolate the first TCP proxy when the emulated TCP connection is not in use and to convey incoming data packets from the incoming one-way link to the host computer and convey outgoing data packets from the computer to the outgoing one-way link, bypassing the first TCP proxy.

14. The method according to claim 13, wherein actuating the first and second switches comprises controlling actuation of the switches using a hardware security module (HSM).

15. A method for communication, comprising:
connecting a station to a packet data network through first and second interfaces having different, respective first and second network addresses;
connecting a terminal to the packet data network through third and fourth interfaces having different, respective third and fourth network addresses; and
emulating a Transmission Control Protocol (TCP) connection between the station and the terminal by transmitting first TCP frames from a first TCP proxy deployed in the station to a second TCP proxy deployed in the terminal only over a first path through the packet data network directed from the first interface to the third network address, and transmitting second TCP frames from the second TCP proxy in the terminal to the first TCP proxy in the station only over a second path through the packet data network directed from the fourth interface to the second network address,
wherein emulating the TCP connection comprises running the second TCP proxy on a hardware security module (HSM) in the terminal.

16. The method according to claim 15, wherein actuation of the HSM to emulate the TCP connection is conditioned on presentation of a hardware credential to the HSM.

17. The method according to claim 15, wherein emulating the TCP connection comprises actuating a first switch to connect the third interface to the HSM and actuating a second switch to connect the fourth interface to the HSM only when the emulated TCP connection is in use.

18. The method according to claim 17, and comprising receiving and transmitting data packets by a host processor in the terminal from and to the packet data network via the third and fourth interfaces, respectively, and coupling the host processor to the HSM so as to transmit and receive data over the emulated TCP connection,
wherein the first and second switches are configured to isolate the second TCP proxy when the emulated TCP connection is not in use and to convey incoming data packets from the third interface to the host processor and convey outgoing data packets from the host processor to the fourth interface, bypassing the first TCP proxy.

* * * * *

UNITED STATES PATENT AND TRADEMARK OFFICE
CERTIFICATE OF CORRECTION

PATENT NO. : 10,356,226 B2
APPLICATION NO. : 15/412014
DATED : July 16, 2019
INVENTOR(S) : Lior Frenkel Page 1 of 1

It is certified that error appears in the above-identified patent and that said Letters Patent is hereby corrected as shown below:

On the Title Page

Item (73) Assignee should read Waterfall Security Solutions Ltd.

Signed and Sealed this
First Day of October, 2019

Andrei Iancu
*Director of the United States Patent and Trademark Office*